United States

Sharpless

[11] 3,768,886

[45] Oct. 30, 1973

[54] VARIABLE COLOR DISPLAY DEVICE AND PROJECTION MEANS THEREFOR

[75] Inventor: Edward N. Sharpless, Pitcairn, Pa.

[73] Assignee: Liquid Crystal Industries, Inc., Turtle Creek, Pa.

[22] Filed: May 27, 1970

[21] Appl. No.: 40,889

[52] U.S. Cl. .... 350/160 LC, 40/106.21, 40/106.22, 40/106.51, 40/106.52, 350/149
[51] Int. Cl. .............................................. G02f 1/28
[58] Field of Search ............... 40/106.21, 106.23, 40/106.52, 106.54; 350/160 LC, 149; 356/32

[56] References Cited
UNITED STATES PATENTS

| | | | |
|---|---|---|---|
| 3,701,368 | 10/1972 | Stern | 350/160 LC |
| 3,597,043 | 8/1971 | Dreyer | 350/149 |
| 3,590,371 | 6/1971 | Shaw, Jr. | 350/160 |
| 3,620,889 | 11/1971 | Baltzer | 350/160 |
| 3,511,086 | 5/1970 | Woodmansee | 350/160 |
| 3,533,399 | 10/1970 | Goldberg et al. | 350/160 |
| 3,441,513 | 4/1969 | Woodmansee | 350/160 LC |
| 3,464,132 | 9/1969 | Matisse | 40/106.52 |

OTHER PUBLICATIONS

J. L. Fergason, "Liquid Crystals," Scientific American Vol. 211, Aug. 1964, pp. 77-82 & p. 85.
Materials Engineering, J. A. Mock, Feb. 1969, pp. 66-67.
Product Engineering, A. J. Parisi, July 1968, pp. 19-25.
"Liquid Crystals," Product Engineering, Vol. 35, 12/21/64, pp. 56-57.
E. J. Klein, A. P. Margozzi, "Apparatus for the Calibration of Shear Sensitive Liquid Crystals" Rev. of Sci. Inst., Vol. 41, No. 2, 2/70, pp. 238-239.
Porter & Johnson, J. of Applied Physics, Vol. 34, No. 1, 1/63, pp. 51-59.
Fergason et al., "Liquid Crystals & Their Applications," Electro-Technology 1/70, pp. 41-50.

*Primary Examiner*—Ronald L. Wibert
*Assistant Examiner*—Paul K. Godwin
*Attorney*—Don J. Smith

[57] ABSTRACT

A display device for presenting a visual indication of pressure, said device comprising a support capable of supporting a layer of liquid crystalline material thereon, said material having a characteristic of selective light scattering which is variable in accordance with applied deformational stress, and means for applying deformational stress to said material.

12 Claims, 9 Drawing Figures

Patented Oct. 30, 1973

INVENTOR
BY Edward N. Sharpless.

Buell, Blaks & Ziesenheim
HIS ATTORNEYS

Patented Oct. 30, 1973

INVENTOR
Edward N. Sharpless.

BY

HIS ATTORNEYS

VARIABLE COLOR DISPLAY DEVICE AND PROJECTION MEANS THEREFOR

The present invention relates to an unexpected color display or aesthetic device and to projection means for projecting and/or varying the color patterns produced by the device of the character described for display, advertising, aesthetic, entertainment or decorative effects or purposes.

Devices for displaying color patterns for various purposes are legion. These devices usually employ various colored materials or surfaces, color filters or simply lights of various colors. Many of these devices are capable only of displaying colors or color patterns of an unnaturally fixed or varying nature, and their usefulness is thereby limited. Particularly in displays for decorative or aesthetic purposes, the "novelty wears off" all too soon.

Color display devices in the form of various kinds of light projecting machines are likewise available for use in advertising, entertainment and in the purely decorative field. For the most part, these machines rely on solid crystalline or plastic colored materials, photographic slides, systems of mirrors with color filters attached, movable arrays of color filters, or simply lights of various colors which may be movably disposed or otherwise sequenced to illuminate the object or area with the intended color pattern or patterns. While some of these machines work reasonably well in a limited range of applications, the machines usually are complex in construction owing to mechanical repetition of various components. The available color patterns or color variation is severely limited in most cases. The colors or color patterns are usually overly brilliant, cold, or otherwise un-natural in their hues and intensities.

In most color display devices, particularly those adapted for the projection of colored light, there is the frequent requirement that several such devices or systems be used to approach the desired aesthetic or decorative effects. The number of moving components of these systems are thereby multiplied, leading to maintenance problems. When several such light systems are utilized, a time synchronization is often required, particularly when one attempts to associate music with a changing color display or an analogous dynamic lighting system. This objective is difficult to accomplish with conventional systems owing to large numbers of moving parts and other practical difficulties. Moreover, the potential variation in color patterns has been severely limited for the reasons pointed out above.

In many other fields of endeavor, it is desired to illuminate relatively large areas in varying color patterns. For example, in the field of theatrical lighting, various types of colored illumination has been employed for many years. Presently, this is accomplished by rather complex lighting systems, as alluded to above, requiring the services of a skilled operator to arrange the necessary combination of lighting components to achieve a desired color or color pattern. Conventionally theatrical lighting systems for this purpose include a light source with a plurality of solenoid-operated color filters for selective orientation in front of the light source for varying the color saturation with which the stage is illuminated. Such equipment may require several hundred color panels, and numerous light sources, all of which must be operated by skilled personnel.

Certain of these problems have been alleviated to some extent by the projection and display devices disclosed in the U.S. Pats. to Clark, III No. 3,431,044; Lane et al. No. 3,315,391; and Billings No. 2,600,962. The Clark device inherently involves a number of moving parts but limited color variation. The potential color variations achieved by the Clark device are limited by employment of a solid double refractive member. The polarizing panels of the Clark arrangement, when crossed, would considerably reduce light transmittance.

A similar arrangement is shown in the Lane et al. reference in which the intermediate solid member is additionally deformed to simulate motion. The Billings device is analogous, except that a stress-responsive birefringent crystal is employed. The Billings arrangement, moreover, is not directed to the problem of aesthetic or decorative lighting, as it is arranged to pass very narrow optical bands.

In general, the variety of color patterns attainable with devices such as disclosed by Lane et al and Clark is limited, owing to the employment of birefringent solid members. In addition, the cited references require the use of various light polarizing structures, which are not essential in certain forms of my invention.

I overcome these disadvantages of the prior art by providing a unique optical display device capable of producing an infinite variety of color variations and patterns. The solution to this perennial problem is realized by introducing a liquid crystalline material into a display device of novel construction. Desirably the liquid crystalline material is selected which has a characteristic of variable light scattering and attendant transmittance at room temperatures or at least at those environmental temperatures under which the device is employed. For example, a liquid crystalline material can be selected, which is capable of such variable transmittance at operating temperatures in the region of a projection bulb or other illuminating light source, for example one utilized in an advertising sign or other display arrangement. The selected liquid crystalline material preferably exhibits a variable scattering or transmitive characteristic when subjected to mechanical deformation, such as occasioned by shear or flow stresses.

Accordingly, my novel display device or liquid crystal cell is provided firstly with a light transmitting wall to permit viewing of the contained liquid crystalline material. Secondly, the liquid crystalline cell is associated with means for inducing mechanical stresses within the contained liquid crystalline material. This can be accomplished in a variety of ways: For examples, the liquid crystalline cell can be constructed with means permitting the displacement of one wall structure thereof relative to another. Circulating means can be associated with the cell or display device for inducing flow and attendant shear stresses within the liquid crystalline material.

My display device as thus far described is capable of a large number of applications, for example as an aesthetic novelty, decorative wall and table top panels, back drops for stages and other illuminated areas, and numerous analogous applications. For this purpose, background or environmental illumination is sufficient for viewing the infinite variety of color patterns resulting from a stress-manipulation of my display device.

I also contemplate the use of polarizing means to enhance or modify the color patterns. One or two polarizing panels can be employed for this purpose and at least one of the panels can optionally be secured to or provided as a support for a film of the liquid crystal. Where the liquid crystal is preferably enclosed in a display container, the polarizing panel can be mounted on a light-transmitting wall structure of the container or the panel can form the wall structure. Where a pair of polarizing panels are used, the liquid crystalline material can be mounted therebetween, with one or both panels forming at least part of the support or container for the liquid crystal. The two polarizing panels can be crossed without impairing visibility of the color patterns exhibited by the liquid crystal, as a liquid crystal is selected in such case for the characteristic of circular dichroism. In one arrangement of the invention, the display device and the polarizing means or at least one of the polarizing panels are arranged for relative rotation so that the observed color patterns can be varied both by applied deformational stresses as well as by modification of the incident illumination.

In another arrangement of my invention, a synchronous motor can be provided for operating the aforementioned color varying means (for example the rotatable polarizing means or the mechanical stress varying means, or both) in accordance with a timed or rhythmic sequence for synchronizing my color display device with music or other rhythmic operation. I also desirably provide means for cooling the liquid crystal cell when employed in conjunction with my novel projection arrangement.

My invention also contemplates means especially arranged for projecting or otherwise enhancing the aesthetic effects produced by my novel display device. Such means includes a projecting and polarizing arrangement suitable for projecting the color patterns of my display device upon a wall of a room, a stage and/or its occupants, cinema-type screen, or other surface on which an infinitely variable color patterns is desired for aesthetic, decorative or entertainment purposes. A large number of applications of my inventions in the advertising field for various types of eye-catching signs and displays will become readily apparent.

My display device is capable of producing nonrepetitive color patterns which are a mixture of natural hues and intensities. The effects achieved are warm, relaxed, and psychologically subdued and are therefore particularly desirable for decorative and other aesthetic purposes.

Besides its aesthetic values, my display device is useful in depicting, as a color display, relative motions between or among a number of objects. Such relative motions can be comparatively slight and even of a vibratory nature. Of greater significance is the capability of simultaneous indication of a number of forces applied externally to my display device at a given time.

I am aware, of course, of a number of United States patents relating to various applications of liquid crystalline materials. For example, Fergason et al., U.S. Pat. No. 3,114,836 depicts an imaging device, which exhibits a color pattern on a film of liquid crystal upon focusing a heat or thermal pattern thereon. Fergason U.S. Pat. No. 3,409,404 discloses a liquid crystalline device in which variation in selective scattering of liquid crystalline materials is employed for identifying unknown materials. Williams U.S. Pat. No. 3,322,485 utilizes a threshold characteristic of liquid crystalline material to scatter light selectively in the presence of a given electric field. Freund et al. U.S. Pat. No. 3,364,433 employs a frequency-shifting characteristic of liquid crystalline materials in the presence of an electric and/or magnetic field. None of these references, however, discloses a color display device utilizing liquid crystalline materials in which an infinite or non-repetitive pattern is exhibited by a liquid crystalline material applied by attendant variation in applied mechanical stresses.

I accomplish these desirable results by providing a display device for presenting a visual indication of pressure, said article comprising a support capable of supporting a layer of liquid crystalline material thereon, said material having a characteristic of selective light scattering which is variable in accordance with applied deformational stresses and means for applying deformational stresses to said material.

I also desirably provide a similar display device wherein said support is a container having a light-transmitting wall structure through which said material can be observed.

I also desirably provide a similar display device wherein said stress applying means include means for effecting a flow of said material relative to said container.

I also desirably provide a similar display device wherein said container is fabricated entirely from a transparent material.

I also desirably provide a similar display device wherein said support is a light-polarizing panel.

I also desirably provide a similar display device wherein additional light-polarizing means are mounted adjacent said panel and means are provided for relatively rotating said panel and said additional polarizing means.

I also desirably provide a similar display device wherein cooling means are coupled to said circulating means for maintaining said material within a temperature range at which said light scattering characteristic approaches a maximum condition.

I also desirably provide a similar display device wherein said display device is arranged for operation adjacent a source of infrared radiation, and a thermal shield is interposed between said support and said radiational source, said heat shield including a relatively flat transparent container substantially coextensive with said support to permit viewing of said material therethrough, and means for circulating a coolant fluid through said shield container.

I also desirably provide a similar display device wherein projecting means are provided for said display device, said projecting means including a light source and condenser and objective lens systems, means for supporting said display device between said lens systems, and a light polarizing filter is disposed between said display device and at least one of said lens systems.

During the foregoing discussion, various objects, features and advantages of the invention have been set forth, or alluded to. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
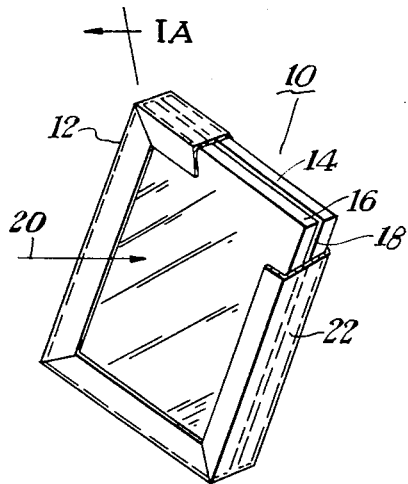
FIG. 1 is an isometric view, partially broken away, of one form of liquid crystal cell or display device arranged in accordance with my invention.
Figure 3:
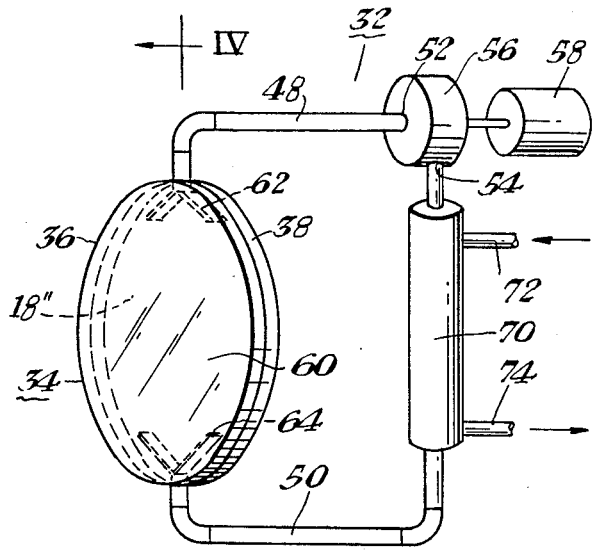
FIG. 3 is an isometric view of another form of display device of my invention and incorporating modified means for inducing deformational stresses within the liquid crystal.
Figure 1A:
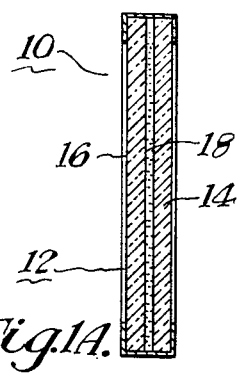
FIG. 1A is a cross-sectional view of the device of FIG. 1 and taken along reference line 1A—1A thereof.
Figures 4, 4A:
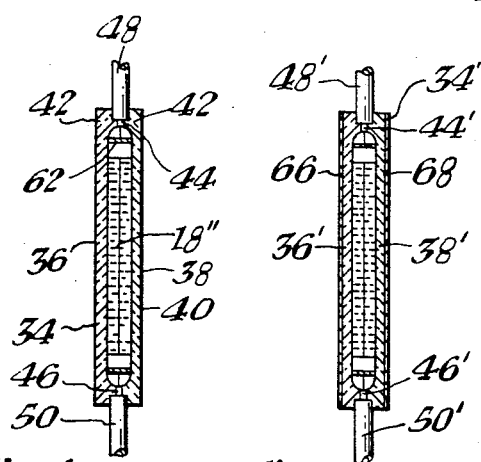
FIG. 4 is a cross-sectional view of the device as shown in FIG. 3 and taken along reference line IV—IV thereof.
FIG. 4A is a similar view of a modified form of the display device shown in FIGS. 3 and 4.

With reference now to FIG. 1 of the drawings, a display device 10 in the form of a liquid crystalline support 12 is illustrated therein. In this arrangement, the support 12 in the form of a flat container having apposed wall structures 14, 16 of any suitable size and shape. In the arrangement shown, the wall structures 14, 16 are substantially coextensive although this is not an essential requirement. In point of fact, one of the wall structures 14, 16 can be significantly smaller than the other wall structure, as long as one wall structure is joined about its periphery to the other wall structure, for example in the manner described below. Likewise, the wall structures 14, 16 need not be of square or rectangular configuration as illustrated but can be of some other configuration for example circular as illustrated in FIG. 3. It is contemplated however, that any geometrical or non-geometrical, symmetrical or non-symmetrical shape can be employed for either or both of the wall structures 14, 16. As noted previously, the wall structures 14, 16 need not be coterminous. Further, the wall structures 14, 16 need not be planar as shown in FIG. 1A but instead one or both sides thereof can be dished or otherwise configured as indicated in FIG. 4.

Depending on the manner in which the wall structures 14, 16 are joined, the resilience and hence the thickness of either or both of the wall structures 14, 16 may or may not be critical. Such criticality, whether encountered depends on the manner in which deformational stresses are to be applied to a liquid crystalline material 18 confined between the wall structures 14, 16. In the arrangement of my novel display device as illustrated in FIG. 1, at least one of the wall structures 14, 16 is sufficiently thin or is made of a suitably plastic material as to lend a resilient character to the wall structure. Thus, the wall structure, such as the wall structure 16 can be bent or otherwise deformed toward the wall structure 14 when a force is applied more or less transversely thereto as denoted by arrow 20. By thus bending one of the wall structures 14, 16 relative to the other, the liquid crystalline material 18, which is supported, in this example, between the wall structures 14, 16 in film-like form, is caused to flow generally away from the region of applied force (arrow 20) to other regions of the volume confined within the liquid crystal support 12. The application of the force 20 and the resultant flow of the liquid crystal 18 develops shear and other deformational stresses within the liquid crystal 18. Such stresses modify the light scattering and attendant transmittance characteristics of the liquid crystal material 18 and result in an endless variety of color changes and patterns.

In order to observe these aesthetic color changes, at least one of the wall structures 14, 16 is light transmitting, and preferably both of the wall structures 14, 16 are light transmitting to permit the display device 10 to be observed from either side thereof. Desirably, both of the wall structures 14, 16 are made transparent for optimum visual characteristics, as when the display device 10 is employed in the projection arrangement of FIG. 6.

As noted previously, at least one of the wall structures 14, 16 is joined about its periphery to a surface of the other wall structure. In the FIG. 1 arrangement such joining means are further arranged to peripherally seal one wall structure to a surface of the other. In the display device 10, such joining and sealing means includes a pressure-sensitive tape 22, which is compatible with the material of the wall structures 14, 16 and covers their coextensive peripheral edges. The liquid crystal 18 is thereby sealed in the context of film thicknesses within the space defined by the slightly separated wall structures 14, 16 and the peripheral tape 22. It will be understood, of course, that the separation between the wall structures 14, 16 can be different from that illustrated, depending upon the relative quantity of liquid crystal 18 which is used. Generally, a relatively thin film of liquid crystal 18 should be enclosed between the wall structures 14, 16 to conserve the liquid crystalline material.

In those cases wherein the joining and sealing tape 22 is quite flexible and more or less loosely applied at the wall edges or is at least somewhat elastic, one or both of the wall structures 14, 16 can be made thicker and hence less resilient. In such cases, an eccentric application of the deformational force 20 will cause one of the wall structures to become slightly canted or angulated or otherwise displaced relative to the other in order to induce deformational flows in the liquid crystalline material. Such deformational flows are, of course, aided by the elasticity and/or edge slackness of the joining and sealing tape.

The liquid crystalline material 18 is selected from one or more of those materials which exhibit variation in light scattering and attendant transmittance characteristics under deformational stresses. Desirably, such variations are within the visible range at room temperatures or at whatever ambient temperature conditions prevailing in the area of utilization of the display device 10. As an example of the latter situation, the liquid crystalline material 18 can be one of those which exhibit visual stress variation in the aforementioned characteristics at or near body temperature, and is therefore useful when the display device is held in the observer's hand. Larger display devices 10 can of course be bathed with infrared radiation, if their liquid crystals are not of the room temperature — visual variety.

On the other hand, display devices for outdoor use, as for signs and other advertizing situations, require liquid crystalline materials exhibiting stress indicia at correspondingly lower temperatures.

There are a considerable number of substances which exhibit the characteristics required of the liquid crystalline material 18. In general the category of materials known as cholesteric liquid crystals are suitable for use with my invention and exhibit an optical phenomenon known as selective scattering of white light. The appellation of this categorization of liquid crystals originates in the frequent use of cholesterol as the starting material in synthesizing these organic substances. The derivatives of cholesterol usually are liquid crystalline in character and demonstrate the characteristic of selective light scattering. Liquid crystalline substances fall additionally into the general chemical classifications of esters, carbonic esters, eithers, schiff bases, and related classes. Nominally, the cholesteric liquid crystals are not limited to the use of cholesterol as a base material. Many steroids exhibit similar optical characteristics when synthesized into the general classifications of organic compounds, as mentioned above. These and other "cholesteric" liquid crystals are useful for the purposes of my invention as long as their molecular conformation exhibits the necessary anisotropic and optical characteristics.

For the purposes of my invention, I employ a cholesteric liquid crystalline material which exhibits a relative optical phenomenon attendant to the selective scattering characteristic of this category of liquid crystal. The latter characteristic is the stress or shear sensitivity of certain cholesteric materials whereby the selective scattering characteristic is varied upon the application of deformational stresses.

Cholesteric materials will selectively and visibly scatter white light, at or near room temperature conditions, when two or more of these substances are admixed in proper proportions. Mixtures of liquid crystals can be selected or varied to obtain visual responses at other temperatures for the purposes mentioned previously. It is observed that a physical deformation of the liquid crystal will shift the frequency of the observed cholesteric color display or pattern, when viewed at a given angle, toward the blue or shorter wave length end of the visible spectrum. The amount of color shift, measured in wave length units, can be employed to indicate quantitatively the physical stress applied to the cholesteric material, when a given liquid crystalline material has been properly calibrated.

A constant pressure applied to the liquid crystalline material will not, after its initial application, thereafter appreciably effect the then observed color patterns. Instead, the great variety of color changes or patterns exhibited by my display device are produced by changes in applied forces and attendant deformational stresses. With acceleration of changing deformational stresses, in either direction, changes in the observed color patterns become more pronounced.

It has also been observed that the application of a constant deformational stress over a significant period of time will initially induce an observable change in the cholesteric color pattern, which despite continued stress, will revert to the unstressed or original cholesteric color in time. That is to say, there is a relaxational effect in the liquid crystalline structure, owing to its nature.

It will be understood herein that a cholesteric substance is one which amylcyanobenzylidineaminocinnamate in the cholesteric state at a certain temperature. The cholesteric state of such substance exists in the region between the temperature at which the substance behaves as a true liquid and the temperature at which the substance is a solid. In the cholesteric state the substance is optically negative, has a strong rotatory power, selectively scatters light to give vivid colors (or monochromatic light to give areas of darkness and brightness), and exhibits circular dichroism. Such a physical state is especially notable in derivatives of cholesterol and like materials, although a relatively few other substances such as optically active amylcyanobenzylidineaminochinnamate and the aforementioned steroids exhibit the cholesteric state.

The liquid crystalline substances herein contemplated will be in the cholesteric state within at least a certain temperature range, but as the temperature is raised above, or depressed below, this range the substances will pass into another mesomorphic state or into a normal liquid or solid state. Thus, the cholesteric substance will be in the cholesteric state at a first temperature and will change its phase into some other state at a second temperature. Generally, it is preferred in the practice of this invention that the second temperature be higher than the first temperature. The range of temperatures within which a visible color display is exhibited as a result of scattering of white light can be determined by a proper selection of cholesteric substances and will be referred to as the color play range.

Cholesteric substances used according to the present invention can be chosen from a wide range of compounds exhibiting the cholesteric phase. Derivatives of cyclopentanophenanthrene are desirably used. There are a number of factors to be considered in selecting such derivatives: All of the ring systems should be in the trans configuration, the 3-substituent (on the A ring) should be in the β-configuration, and there should be no more than two axial methyl groups. Unsaturation at the five, six carbon atom bond can have an effect on the melting point, but otherwise has little effect on the formation of the cholesteric phase. Thus, derivatives of such cyclopentanophenanthrenes as cholesterol, campesterol, ergosterol, β-sitosterol, stigmasterol, and like materials can be used.

It is preferred in the present invention to utilize alkyl and aryl derivatives of the cyclopentanophenanthrene materials, particularly those derivatives which are esters of alkanoic or aralkanoic acids, or mixed alkyl esters of the cyclopentanophenanthrene material and carbonic acid. The alkanoic acids used can contain from one to 24 or more carbon atoms in the molecule, and can be saturated or unsaturated and straight or branched chain. It is preferred to utilize esters comprising higher fatty acids containing from 9 to 22 carbon atoms or lower saturated or unsaturated phenalkanoic acids having 1 to 3 carbon atoms. Mixed carbonate esters comprising alkanols having from 1 to 22 carbon atoms and cholesterol are also among the preferred cholesteric substances.

Such derivatives of cholesterol are presently preferred in certain aspects of the invention. Thus, useful cholesteric substances include cholesteryl nonanoate, cholesteryl caprylate, cholesteryl laurate, cholesteryl palmitate, cholesteryl stearate, cholesteryl arachidate, cholesteryl behenate, cholesteryl oleate, cholesteryl linoleate, and cholesteryl linolenate, cholesteryl benzoate, cholesteryl cinnamate, cholesteryl dihydrocinnamate, and the like. Carbonate esters such as oleyl cholesteryl carbonate, stearyl cholesteryl carbonate, methyl cholesteryl carbonate, ethyl cholesteryl carbonate, pentyl cholesteryl carbonate, and the like carbonates are very useful in the present invention.

It will be appreciated by those skilled in the art that a pure cholesteric substance may have only a narrow color play range. However, where this color change does not occur at the temperature of interest, several stratagems permit coverage of a broad range of temperatures from 0° C, and even down to −40° C, up to and above 250° C. One method of varying the color play temperature range is to prepare a substance at a desired purity level, as increased impurities usually lower the temperature range. One convenient method of carrying out this adjustment is to admix a plurality of chemically distinct cholesteric substances having different color play temperature ranges until the desired temperature range is obtained. Another method of adjusting the color play range is to prepare the substance in a highly purified form and to admix enough of a less refined aliquot or aliquots of the substance with the purer material until the desired change of color play range is obtained. For instance, in this latter aspect, a 99.99 percent pure cholesteryl oleyl carbonate can be prepared and admixed with less refined material. Those skilled in the art will have no difficulty in providing a desired transition temperature for use in the compositions and articles of the present invention. All parts, proportions, percentages and ratios herein are by weight unless otherwise stated.

The following tabulation will exemplify a few of the many color play regions obtained with the cholesteric substance or substances:

| Substance(s) | Color Play Region (°C) |
|---|---|
| 80% Cholesteryl oleyl carbonate<br>20% Cholesteryl acetate | 0–4 |
| 95% Cholesteryl oleyl carbonate<br>5% Cholesteryl acetate | 16–18 |
| 65% Cholesteryl oleyl carbonate<br>25% Cholesteryl nonanoate<br>10% Cholesteryl benzoate | 17–23 |
| 45% Cholesteryl oleyl carbonate<br>45% Cholesteryl nonanoate<br>10% Cholesteryl benzoate | 26.5–30.5 |
| Cholesteryl cinnamate | 180–260 |
| 80% Cholesteryl nonanoate<br>20% Cholesteryl propionate | 45–65 |
| 20% Cholesteryl butyrate<br>80% Cholesteryl nonanoate | 55–75 |
| 20% Cholesteryl methyl carbonate<br>80% Cholesteryl nonanoate | 22–47 |
| 90% Cholesteryl cinnamate<br>10% Cholesteryl nonanoate | 140–250 |
| Cholesteryl benzoate | 146–178 |
| Cholesteryl butyl carbonate | 45-below 0 |
| 20% Cholesteryl dihydrocinnamate<br>80% Cholesteryl nonanoate | 64–67 |

It will accordingly be appreciated that one, two or more cholesteric substances can be mixed to obtain the requisite color play temperature range, and that both the temperature and the range of temperatures can be widely varied. It is desirable that the cholesteric substance(s) not crystallize at the lowest temperature at which they are held before use.

As disclosed above, a desired melting range can also be obtained by varying the purity of cholesteric substances. It is usually found that increasing the purity raises the temperature of the color play region and a narrowing of the range is also frequently obtained. It will, of course be appreciated that the presence of excessive quantities of impurities will ultimately entirely prevent obtaining of the cholesteric phase, especially if the impurities themselves are not cholesteric substances. The cholesteric substance(s) can also comprise up to 5 percent or so of miscible materials such as fatty acid triglycerides to lower the range. As disclosed hereinafter, it is most desirable to protect the cholesteric substance from the milieu to obviate the imbibition of impurities by the cholesteric substances and thereby to maintain the desired color play temperature.

As an illustration, cholesteryl oleyl carbonate is prepared as described in "Detection of Liquid Crystals," AD U.S. Pat. No. 620 940, U.S. Department of Commerce (August 1965). A portion of the cholesteryl derivative is purified by solvent extraction and washed with methanol. The purified cholesteryl material is found to have a color play temperature of 21°–22° C. Admixing 80 parts of this material with 20 parts of an unpurified material provides a color play temperature of 15°–16° C.

The cholesteric materials for use with this invention can also include a cholesteryl halide. Although cholesteryl fluoride can be prepared, the desired halides for use herein are cholesteryl chloride, cholesteryl bromide, cholesteryl iodide, and mixtures of these halides. The preferred halide for use herein is cholesteryl chloride.

The cholesteryl halide serves to provide a uniform color over a broad range of temperatures in which the cholesteric substance or substances are in the cholesteric phase. Thus, in such case, my novel display device shows a single color below transition to the condition wherein the liquid crystal does not scatter visible light, i.e., the condition in which it becomes colorless. The color below the transition point can be selected according to the amount of cholesteryl halide used. As the quantity of halide is increased from about 15 percent of the composition up to above 40 percent, the color usually varies from deep violet to deep red. The quantity of halide used will also vary according to the particular cholesteric substances utilized. It has been found, however, that this color also varies according to viewing angle, depth of the liquid crystal layer, and the aforementioned deformation stresses, all of which, when combined with my display device, produced an interesting and unexpected variety of color patterns.

These halides are conveniently prepared by refluxing the cholesterol with an excess (twice or more, stoichiometrically) of a thionyl halide for 48–72 hours and distilling the mixture thereafter to remove unreacted material. Generally, the purity of the halides is sufficient to permit the desired change of phase from the cholesteric. It is preferred that the halides be at least 90 percent pure. Such halides usually have a tendency to raise the color play temperature range of the cholesteric substance(s).

Specific examples of liquid crystalline compositions useful for my present invention appear below, wherein all amounts are in parts, "ChCl" is cholesteryl chloride melting at 94°–95° C; "High ChOlC" is cholesteryl oleyl carbonate showing a color play at 20°–22° C; "Low ChOlC" is cholesteryl oleyl carbonate showing a color play at 5°–6° C; "ChNo" is cholesteryl nonanoate; and the temperature is that at which the compositions become colorless.

| Example | ChCl | High ChOlC | Low ChOlO | ChNo | Temp. |
|---|---|---|---|---|---|
| I | 27 | 73 | | | 42°C. |
| II | 27 | 58 | | 15 | 45.5°C. |
| III | 27 | 50 | 23 | | 38°C. |
| IV | 27 | 59 | 14 | | 35°C. |
| V | 25 | 75 | | | 48°C. |

Other alkanoic esters of cholesterol or alkyl carbonate esters of cholesterol can be used in the foregoing Examples to provide a broad variety of temperatures and temperature ranges for the liquid crystalline material 18. Likewise, other cholesteric materials such as corresponding derivatives of β-sitosterol, stigmasterol, ergosterol, and the like can be substituted with comparable results.

Figure 2:
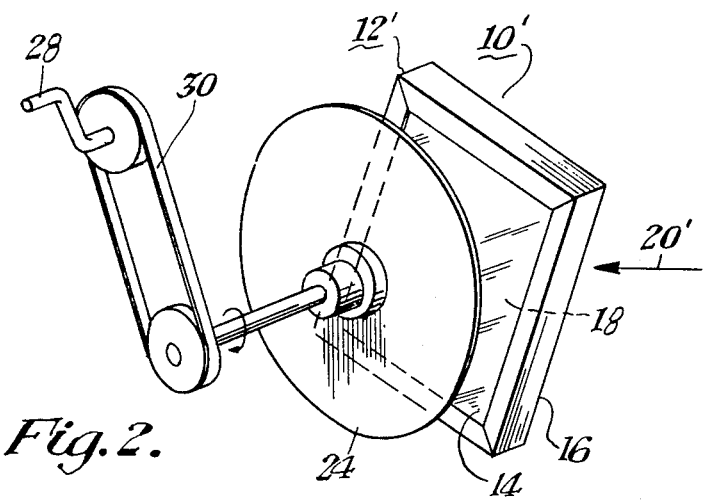
FIG. 2 is an isometric view of a similar display device provided in conjunction with rotatable polarizing means.

In FIG. 2 of the drawings, means are illustrated for enhancing the aesthetic effects or visual display of the display device 10'. Such means encompass the use of polarizing means including one or two polaroid panels or the like, at least one of which is rotatable relative to the display device 10'. One form of such polarizing means includes rotatably mounted disc 24 supported on shaft 26 which is rotated in this example by a hand crank 28 through a suitable transmission denoted generally at 30. Obviously, the shaft 26 can be motor-driven instead. In this arrangement, the polarizing disc or panel 24 is of polaroid material as noted above.

Instead of rotating the disc 24, the liquid crystal container 12' obviously can be rotated instead. In any event, such relative rotation of the display device 10' relative to the polarizing means 24 effectively varies the angle of impinging illumination and thereby effects a gross color change in the variable color patterns produced by the display device 10' when subjected to the more or less transverse deformation forces as denoted by arrow 20'.

In the arrangement of my invention as disclosed in FIG. 2, then, a great variety of color patterns can be produced in the display device 10' through the application of transverse forces 20'. At the same time or sequentially, gross color changes in the produced color patterns can be effected by relative rotation between the polarizing disc 24 and the liquid crystal cell 12'. The unusual and unexpected results thus produced are engendered by the unexpected cooperation between the polarizing disc 24 and the inherent circularly polarizing characteristic of the liquid crystalline material 18'. This characteristic, or dichroism, is present in varying degrees in the aforementioned liquid crystalline materials.

A second polaroid panel or disc (or equivalent polarizing means) desirably is disposed on the other side of the container 12'. The cooperative effect of the polarizing panels and the dichroic character of the liquid crystal greatly and surprisingly enhances the vividness of the visual liquid crystalline color patterns and the changes wrought therein by stress variations. Ancillary to such cooperation is the significant fact that the intensity of the visual color display is not diminished, when the polarizing panels (at least one of which is desirably rotatable, when two are used) are crossed, owing to the dichroic characteristic.

With two polarizing media, one medium desirably is incorporated within the structure of the liquid crystal container 12', as by forming one of the wall structures 14' or 16' of polaroid or other polarizing material. Desirably that wall structure (e.g. the wall 16' in FIG. 2) removed from the external polarizing filter 24 (if used) is so constructed so that the liquid crystal 18' is advantageously disposed between the polarizing means. If rotation of the polarizing is not desired, the external polarizing filter 24 can be omitted and both wall structures can be fabricated from light polarizing material with a constant but advantageous enhancement of color patterns.

Another form of my color display apparatus 32 is illustrated in FIGS. 3 and 4. The liquid crystal container 34 forming part of display apparatus 32 is of modified construction in that it does not depend on the functional displacement of one wall structure relative to another. Instead, the liquid crystal container 34 can be formed from a relatively rigid housing, including in this case bipartite components 36, 38 provided with inwardly dished surfaces 40 as better shown in FIG. 4. Any suitable structural material can be employed for fabricating the housing components 36, 38 although at least one of the components is fabricated from a light transmitting material. Accordingly the housing components 36, 38 can be fabricated from glass, plexiglass, or other material of transparent or translucent character.

A quantity of liquid crystalline material 18'' is sealed between the housing components 36, 38 as evident from FIG. 4. This is accomplished by peripherally joining the thickened edge portions 42 of the housing components 36, 38 by means of a suitable cement. In the event that the housing components 36, 38 are fabricated from certain plastic materials such as poly methacrylic resin, the thickened portions 42 of the housing components can be joined by heat-sealing or solvent welding.

In order to create a variety of varying color patterns within the liquid crystalline material 18'' thus enclosed within the cell 34, means are provided for inducing fluid flows and attendant deformational stresses within the body of the liquid crystalline material 18''. As mentioned above with reference to FIG. 1, the resultant shear and other deformational stresses lead to the changing color patterns of the liquid crystal. One arrangement for so inducing flow of the liquid crystal 18'' includes means for circulating a quantity of liquid crystalline material throughout the volume enclosed by the housing components 36, 38. In furtherance of this purpose, the housing components 36, 38 define a pair of opposed flow apertures 44, 46 when assembled as aforesaid. Alternatively, the flow apertures 44, 46 can be bored in the liquid crystal container 34 after assembly thereof. The apertures 44, 46 provide in this example egress and ingress of liquid crystal relative to the container 34.

To circulate liquid crystalline material 18'' throughout the container 34, a pair of conduit sections 48, 50 are joined to the container 34 as shown. Such joining can be effected by threading the ends of the conduit sections 48, 50 and tapping the apertures 44, 46 or by cementing closely fitting ends of the conduit sections 48, 50 into the apertures 44, 46 or by other suitable securance means.

The conduit sections 48, 50 are joined to the inlet 52 and outlet 54 respectively of a circulating pump 56, which is rotated in this example by a suitable prime mover such as electric motor 58. For smaller sizes of display apparatus 32 and their correspondingly smaller pumps, a manually operated crank (not shown) can be provided. Operation of the pump 56 circulates the liquid crystal material 18'' through the conduit sections 48, 50 and of course at a correspondingly slower rate through the liquid crystal container 34. The circulation thus afforded by the pump 56 can be faster or slower depending upon the particular sequence of changing color patterns which is desired.

The flow patterns desirably are spread out across the face 60 of the liquid crystal container 34 by suitable flow baffle means. One form of such flow baffle means includes a pair of V-shaped baffle members 64, 62 mounted as shown near the outlet and inlet apertures 44, 46 of the cell 34. Other shapes of baffle members can be substituted for the particular baffle members 62, 64 depending upon the flow characteristics desired within the container 34.

For enhancement of the changing color patterns of the liquid crystal 18'', the container 34' can be associated with suitable polarizing means arranged in accord with the exposition of FIG. 2. As shown in FIG. 4A a polarizing disc 66 or 68 can be supported at either side of the cell 34'. One or both of the polarizing discs 66, 68 can be utilized. In a particular arrangement of the invention, wherein both housing components 36', 38' are made transparent, the use of both polarizing discs 66, 68 is preferred. The discs 66, 68 desirably are mounted on the outer surfaces of the container 34, i.e., housing components 36', 38' respectively. In furtherance of this purpose each of the discs can be provided with a pressure-sensitive light-transmitting adhesive on one side thereof so that the disc 66 or 68 can be adhered directly to the juxtaposed face of the liquid crystal container 34'. Desirably, the adhesive characteristic of at least one of the polarizing discs 66, 68 is of a lesser order so that the polarizing discs can be readily peeled off and reoriented upon the liquid crystal container 34' to effect a gross change in its color patterns, the variable nature of which is dependent primarily upon the flow of liquid crystal through the conduit sections 48', 50'.

Figure 6:
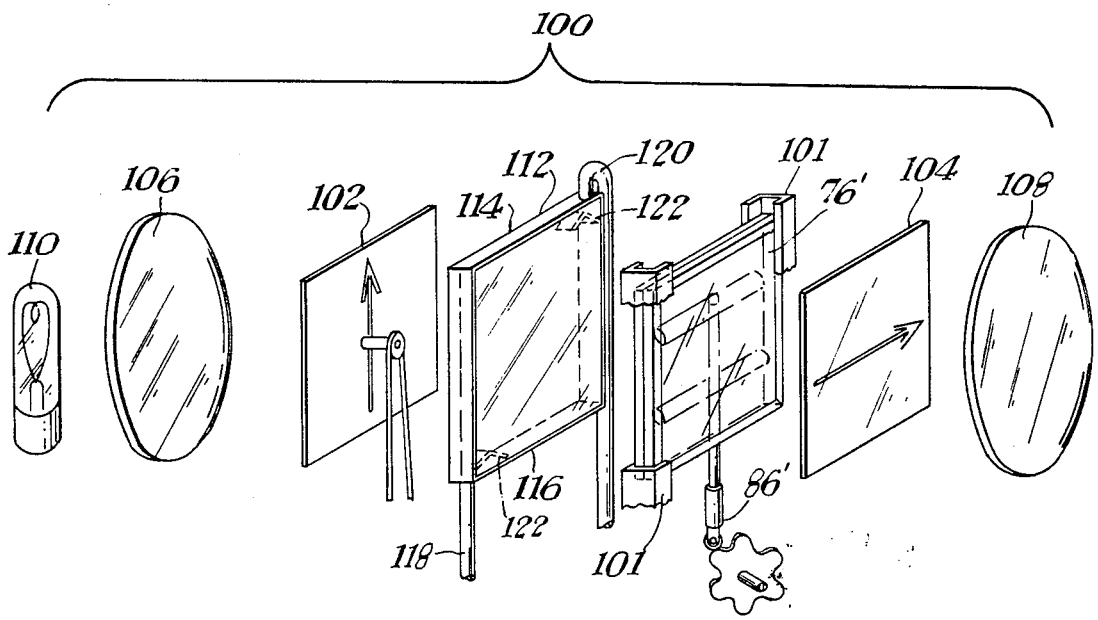
FIG. 6 is an isometric view of novel projection means incorporating a display device of my invention.

In the event that the liquid crystal container 34 or 34' will be used in my projection arrangement of FIG. 6 as described below, or in other areas of high ambient temperature, means can be conveniently associated with the circulating system of the display device 32 for cooling the liquid crystalline material. Cooling becomes necessary when the liquid crystalline material 18 is exposed to an ambient temperature sufficient to cause the liquid crystalline material 18'' to assume an isotropic state resulting in loss of its selective light scattering characteristic. One form of such cooling means includes a cooling jacket 70 or other suitable heat exchanging means associated with at least one of the conduit sections, for example the conduit section 50, as shown in FIG. 3. Cooling water from a suitable source (not shown) can be circulated through the cooling jacket 70 by means of inlet and outlet conduit sections 72, 74. A requisite quantity of heat transmitted to the liquid crystal 18'' through either face of the liquid crystal cell 34, and also any pump-work heat added to the liquid crystal circulating system by the pump 56, can be removed by the heat exchanger 70. The heat exchanger 70 can, of course, be omitted from the display device 32 in those applications not subjected to significant inputs of heat.

It falls within the contemplation of my invention that the deformational stresses applied to the liquid crystal can be modified in accordance with a predetermined sequence to provide a sequenced series of color pattern changes. Thus, the transverse force 20 or 20' (FIGS. 1 and 2) can be so varied or modulated, and likewise the flow patterns through the container 34 or 34' (FIGS. 3 and 4A) can be similarly modified by a sequential speed variation of the pump 56. It is contemplated further that the aforementioned sequential variation of deformational stresses can be given a rythmic response so that the changing color patterns of my display device can be set to a suitable background music, ballet performance or other choreography, marching procession, or other rhythmic activity.

Figure 5:
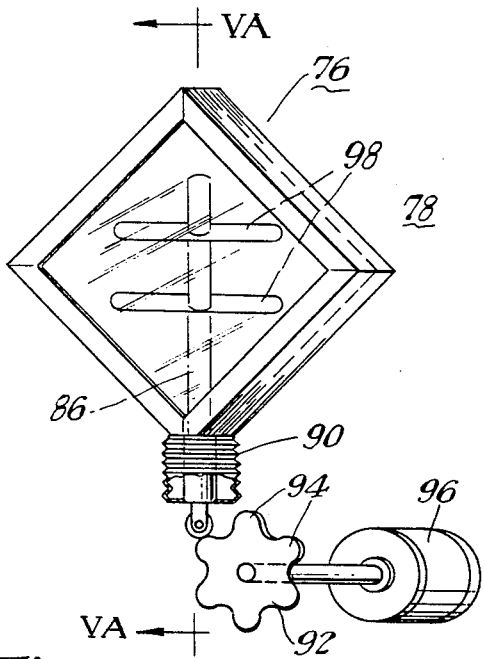
FIG. 5 is an isometric view of still another form of my display device and illustrating a further modification for inducing deformational stresses, in this case in accordance with the timing sequence.
Figure 5A:
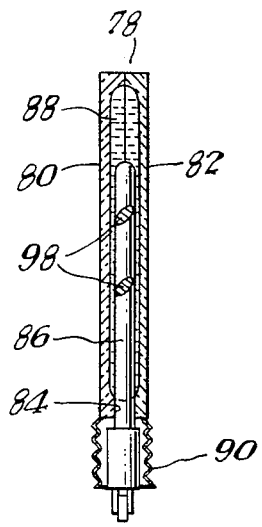
FIG. 5A is a cross-sectional view of the display apparatus shown in FIG. 5 and taken along reference line VA—VA thereof.

One arrangement for thus effecting a rhythmic or other sequential application of deformational forces is illustrated in FIG. 5. In this arrangement, a liquid crystalline container 76 of the display device 78 is constructed generally similar to the cell 34 of FIGS. 3 and 4. In the container 76, however, its components 80, 82 are continuously sealed and joined above their peripheries save for a single plunger opening 84, as better shown in FIG. 5A.

A plunger 86 is protruded through the plunger opening 84 for the purpose of inducing deformational stresses within the liquid crystal 88 in the manner described more fully below. Desirably the plunger 86 is fabricated from a transparent or light transmitting material to offer a minimal interference to the changing color patterns induced in the liquid crystal 88. Means desirably are provided for sealing the plunger 86 to the container 76 to prevent loss of liquid crystalline material and the entrance of foreign matter. A suitable sealing arrangement includes a bellows 90 which is peripherally joined and sealed at one of its ends to the adjacent portion of the plunger 86 and at its other end to the container 76. Use of the bellows 90 permits reciprocation of the plunger 86 while effectively maintaining a sealed environment for the liquid crystal 88. The flow induced within the liquid crystal 88 by the plunger 86 can be enhanced by means of one or more cross arms 98 secured to the plunger 86 (FIG. 5). Means are provided by my invention for reciprocating the plunger 86 in order to induce a flow characteristic within the liquid crystal 88. Where the displacement of the plunger 86, by its reciprocation, is relatively larger with respect to the volume of liquid crystal 88, one of both of the cell housing components 80, 82 can be made resilient to accommodate the corresponding volumetric changes. The aforementioned plunger reciprocation can be synchronized in accordance with a predetermined timed or timing sequence in further accord with my invention. This permits the varying color patterns of the display device 78 to exhibit a sequentially timed or rythmic characteristic. Such characteristic in certain applications amy of itself be a desirable feature of the aesthetic display or decorative effect produced by the display device 78. In other applications, as aforesaid, the rythmic characteristic permits the varying color display to be set to music or other rythmic activity.

One arrangement for thus reciprocating the plunger 86 includes a wheel 92 having a sinusoidal edge contour 94 or the like and rotatably supported adjacent the outward end of the plunger 86 for successive engagement between the plunger 86 and contoured edge of the wheel 92. The contour rises 94, depending upon the particular application of the display device 78, can be uniformly spaced (as shown) about the periphery of the wheel 92 or they can be both of non-uniform spacing and of non-uniform heights (not shown) to afford a maximum variety and change in the color patterns of the display device. However, if the color display is to be set to music or other rythmic activity, the wheel 92 desirably is rotated at a uniform angular velocity, as dictated by the measured beat of such activity, by suitable motive means such as electric motor 96. It is contemplated, of course that a non-uniform, fast or slow rotation of the wheel 92 can be effected, depending upon the particular sequence pattern change which is desired.

With the display devices described thus far, it is contemplated that their sizes can be made small enough to fit in a persons hand, or alternatively, the display arrangement can be made sufficiently large as to cover entire wall surfaces or door or window areas. That is to say, a liquid crystal "cell" can be made of sufficient length and width to cover part or all of a wall surface, ceiling, table top or other furniture surface, stage backdrops, or the like.

Alternatively, again, any of the liquid crystal devices described above can be provided with dimensions similar to that of a conventional photographic slide for projection on a screen or wall surface. One arrangement of a suitable projection means 100 for accomplishing this is illustrated in FIG. 6 and utilizes a liquid crystal container or cell 76' similar to that shown in FIGS. 5 and 5A. The plunger 86' can be operated after the manner of FIG. 5 by the cog-wheel and motor arrangement 92–96 (not shown in FIG. 6) or alternatively the plunger 86' can be manipulated manually. The container components 80', 82' are both light-transmitting and desirably are transparent.

The liquid crystal cell 76' in the illustrated projection arrangement is supported by a suitable bracket 101 between a pair of polarizing filters 102, 104. At least one of the filters, for example the filter 102, can be rotated relative to the liquid crystal cell 76' and remaining filter. The assembly as described thus far in turn is supported between a condensor lens system denoted generally by lens 106 and an objective lens system denoted similarly by lens 108.

In operation, light from a suitable source such as projector lamp 110 is focused onto the liquid crystal cell 76' after passing through the initial polarizing filter 102. The focused light falling upon the liquid crystal cell 76' is selectively transmitted therethrough and through the remaining polarizing filter 104 and is then projected upon a suitable wall surface or screen to reveal, in greatly enlarged form, the varying color pattern of the liquid crystal cell 76'. Means (not shown) desirably are provided for relatively moving the liquid crystal cell 76' and the objective lens 108 for focusing purposes.

The polarizing filters 102, 104 while not essential, are desirable for the enhancement of the color hues and intensities evidenced by the liquid crystal cells 76', as noted previously. Variation in the projected color pattern is effected by manipulating the plunger 86' to induce flow and deformational forces within the liquid crystalline material contained within the cell 76'. A gross color change can be superimposed upon the varying color patterns within the cell 76' by circularly displacing one of the polarized filters for example the filter 102. Manipulation of the filter 102 and the plunger 86' can be performed either simultaneously or sequentially by the operator of the projection arrangement 100.

To prevent loss of the variable light scattering characteristic of the liquid crystalline material, provision of suitable means for cooling the liquid crystalline material is desirable. Such means may take the form of this illustrated in FIG. 3, for example, where the plunger 86' is replaced by a liquid crystal circulatory system.

On the other hand, a suitable and desirably transparent thermal shield or screen 112 can be interposed between the liquid crystal cell 76' and the light source 110 to prevent the heat of the projector lamp from reaching the liquid-crystal cell 76'. The heat screen 112 in this example can be fabricated from a pair of transparent housing components, which can be configured similar to the housing component 36, 38 of the liquid crystal cell 34 shown in FIGS. 3 and 4 and preferably fabricated from a known heat absorbing transparent material such as heat-absorbing glass. Desirably the heat screen 12 is no smaller in size and contour than that of the liquid crystal cell 76'. The housing components 114, 116 of the heat screen 112 can be fabricated from glass or plexiglass and joined in the manner described above in connection with the components of any of the aforementioned liquid crystal containers. In this arrangement flow apertures are provided respectively at a pair of diametrically opposed corners of the thermal shield 112, to which inlet and outlet conduits 118, 120 respectively are joined. The conduits 118, 120 are connected to a source (not shown) of water or other suitable coolant to effect a flow through the heat screen 112. A pair of baffle members 122 can be provided adjacent the inlet and outlet openings of the thermal screen 112 to spread the flow throughout the area enclosed by the housing components 114, 116 thereof. Desirably, the flow baffles 122, are fabricated from a transparent material such as plexiglass.

From the foregoing, it will be apparent that novel and efficient forms of Variable Color Display Device and Projection Means Therefor have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. An area color display device for presenting visual and variably colored indications of variable pressure throughout said display area, said device comprising a container having a substantially rigid wall structure and shaped to define and to enclose a thin layer of liquid crystalline material when placed therein, said layer substantially coextending with said display area, said wall structure at least coextending with said liquid crystalline layer, said layer having sufficient thickness that fluid flows can be induced in any given portion or all of said layer, said container having a light-transmitting wall section through which said material can be observed, said wall section being substantially coextensive with said layer, a quantity of cholesteric liquid crystalline material contained within said container and forming said layer, said cholesteric material having a characteristic of selective light scattering which is variable in accordance with applied deformational stress, means on said container adjacent the periphery thereof for sealing said liquid crystalline material within said container, and means within said container for inducing volumetric flows in said material throughout said layer to apply said stress likewise throughout said layer.

2. The combination according to claim 1 wherein said liquid crystalline material includes at least one of the group consisting of alkyl carbonates and alkanoic esters of cholesterol, B-sitosterol, stigmasterol, and ergosterol.

3. The combination according to claim 1 wherein a quantity of cholesteryl halide is admixed with said liquid crystalline material.

4. The combination according to claim 3 wherein said halide is present in the amount of about 15 percent to about 40 percent of the resulting composition.

5. The combination according to claim 1 wherein said container is fabricated entirely from transparent material.

6. The combination according to claim 1 wherein said container includes a second substantially rigid wall structure apposed to said first-mentioned wall structure, and said stress applying means include resilient joining and sealing means secured about the periphery of each of said wall structures so that one of said structures can be displaced relative to the other.

7. A display device for presenting visual indications of variable pressure, said device comprising a container having a substantially rigid wall structure and shaped to define and to enclose a thin layer of liquid crystalline material when placed therein, said wall structure at least coextending with said liquid crystalline layer, said layer having sufficient thickness that uniform and non-uniform fluid flows can be induced in substantially every part of said layer, said container having a light-transmitting wall section through which said material can be observed, said wall section being substantially coextensive with said layer, a quantity of cholesteric liquid crystalline material contained within said container and forming said layer, said cholestric material having a characteristic of selective light scattering which is variable in accordance with applied deformational stress, means on said container for sealing said liquid crystalline material within said container, means coupled to said container for inducing flow in said material throughout said layer to apply said stress likewise throughout said layer, said container including oppositely disposed inlet and outlet apertures, and said stress applying means including circulating means communicatively coupled to said container at said apertures for effecting a flow of said material throughout said container.

8. The combination according to claim 7 wherein cooling means are coupled to said circulating means for maintaining said material within a temperature range at which said pressure light scattering characteristic approaches a maximum condition.

9. The combination according to claim 7 wherein flow baffle means are enclosed within said container and juxtaposed to said inlet and outlet openings, said baffle means being fabricated from a light-transmitting material.

10. A display device for presenting visual indications of variable pressure, said device comprising a container having a substantially rigid wall structure and shaped to define and to enclose a thin layer of liquid crystalline material when placed therein, said wall structure at least coextending with said liquid crystalline layer, said layer having sufficient thickness that uniform and non-uniform fluid flows can be induced in substantially every part of said layer, said container having a light-transmitting wall section through which said material can be observed, said wall section being substantially coextensive with said layer, a quantity of cholesteric liquid crystalline material contained within said container and forming said layer, said cholesteric material having a characterestic of selective light scattering which is variable in accordance with applied deformational stress, means on said container for sealing said liquid crystalline material within said container, means coupled to said container for inducing flow in said material throughout said layer to apply said stress likewise throughout said layer, said container including an opening, an agitator member substantially enclosed within said container and immersed within said layer, and said agitator member including a part protruding through said opening for moving said agitator member relative to said material.

11. The combination according to claim 10 wherein said agitator member is fabricated from a light-transmitting material.

12. A display device for presenting visual indications of variable pressure, said device comprising a container having a substantially rigid wall structure and shaped to define and to enclose a thin layer of liquid crystalline material when placed therein, said wall structure at least coextending with said liquid crystalline layer, said layer having sufficient thickness that uniform and non-uniform fluid flows can be induced in substantially every part of said layer, said container having a light-transmitting wall section through which said material can be observed, said wall section being substantailly coextensive with said layer, a quantity of cholesteric liquid crystalline material contained within said container and forming said layer, said cholesteric material having a characteristic of selective light scattering which is variable in accordance with applied deformational stress, means on said container for sealing said liquid crystalline material within said container, means coupled to said container for inducing flow in said material throughout said layer to apply said stress likewjse throughout said layer, said display device being arranged for operation adjacent a source of infrared radiation, a thermal shield interposed between said container and said radiational source, said thermal shield including relatively flat transparent containing means substantially coextensive with said container to permit viewing of said container therethrough, and means for circulating a coolant fluid through said shield containing means.

\* \* \* \* \*